W. J. HOLSCHUH.
RESILIENT WHEEL.
APPLICATION FILED JULY 1, 1921.

1,436,042.

Patented Nov. 21, 1922.
2 SHEETS—SHEET 1.

Inventor
William J. Holschuh,
By
Attorneys

W. J. HOLSCHUH.
RESILIENT WHEEL.
APPLICATION FILED JULY 1, 1921.

1,436,042.

Patented Nov. 21, 1922.
2 SHEETS—SHEET 2.

Inventor
William J. Holschuh,
By
Attorneys

Patented Nov. 21, 1922.

1,436,042

UNITED STATES PATENT OFFICE.

WILLIAM J. HOLSCHUH, OF DETROIT, MICHIGAN.

RESILIENT WHEEL.

Application filed July 1, 1921. Serial No. 481,770.

*To all whom it may concern:*

Be it known that I, WILLIAM J. HOL-SCHUH, a citizen of the United States of America, residing at Detroit, in the county of Wayne and State of Michigan, have invented certain new and useful Improvements in Resilient Wheels, of which the following is a specification, reference being had therein to the accompanying drawings.

This invention relates to resilient wheels, and more particularly to that type consisting of a movable wheel body, a hub, and cushioning means between the hub and the wheel body for resisting inward and outward movement of said body and hub with respect to each other and thus providing a wheel which may be advantageously used in connection with automobiles and other driven vehicles.

My invention aims to provide a vehicle wheel of the above type wherein rubber or a similar material or composition is used for cushioning purposes, the rubber having such form as to provide a plurality of separate and circumferentially arranged cushioning devices, between the hub and the body of the wheel.

My invention further aims to provide a wheel body comprising spaced side plates to which a rim may be suitably secured, and the peripheral portion of the side plates are spaced apart by members which will facilitate the use of anti-skid devices on a wheel.

My invention further aims to provide a strong, durable and inexpensive wheel applicable to front or rear axles, and the construction entering into the wheel will be hereinafter described and then claimed, and reference will now be had to the drawings, wherein Figure 1 is an elevation of the outer side of the wheel, partly broken away and partly in section;

Figure 1:
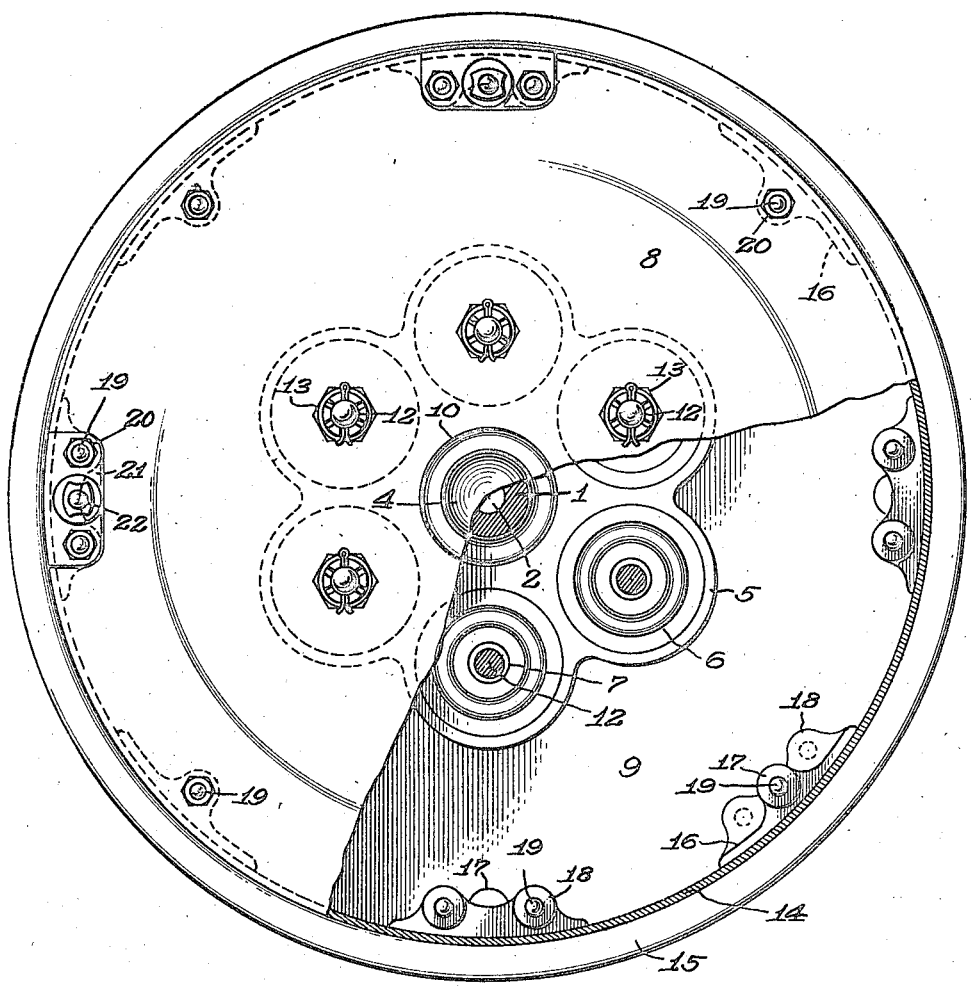
Figure 2:
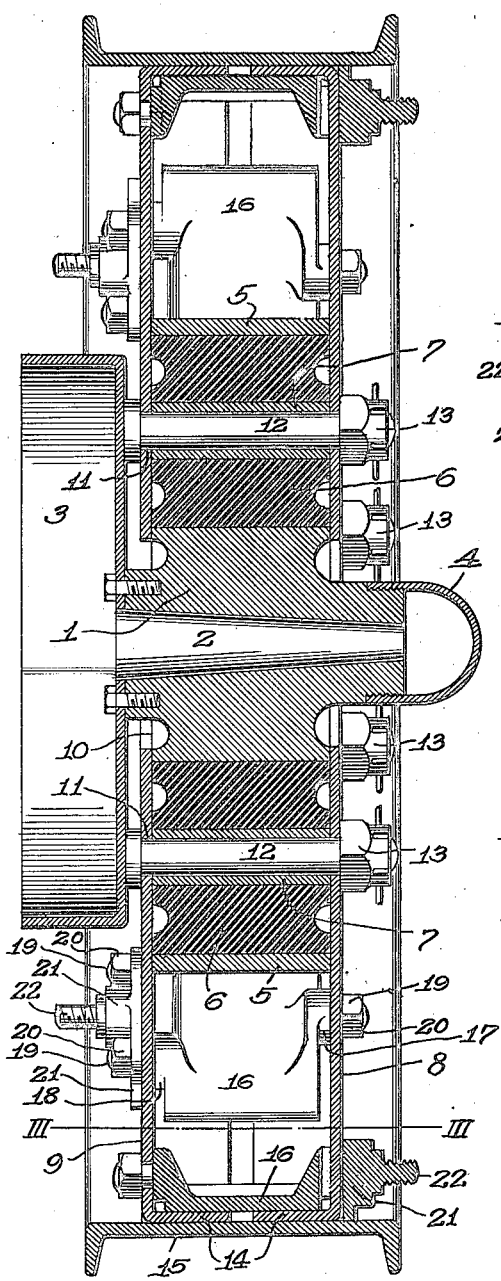
Fig. 2 is a vertical longitudinal sectional view of the wheel.
Figure 3:
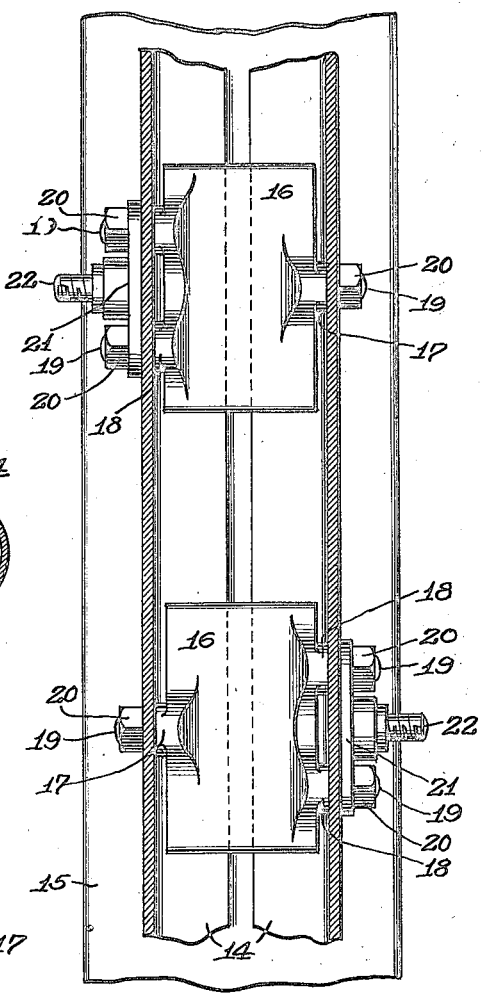
Fig. 3 is a horizontal sectional view of a portion of the same taken on the line III—III of Fig. 2.

In the drawings the reference numeral 1 denotes a hub having the usual axial opening 2 to receive the spindle of an axle or axle knuckle (not shown). The inner end of the hub 1 will be provided, in some instance, with a brake drum 3, and on the outer end of the hub may be mounted a suitable cap 4. Integral with the hub and disposed circumferentially thereof are cylindrical casings 5 and in said casings are placed tubular resilient members 6, preferably made of rubber. Axially of the members 6 are sleeves 7 and these sleeves are preferably of a greater length than the casings 5, for a purpose that will hereinafter appear.

The wheel body is composed of spaced parallel plates 8 and 9, and these plates have concentric openings 10 providing clearance for the hub 1. The plates are also provided with openings 11 to receive bolts 12 which extend through the sleeves 7 and hold the plates 8 and 9 against the ends of the sleeves, the length of said sleeves being such as to permit of free movement of the plates 8 and 9 at the ends of the casings 5 without an undue amount of friction, so that the plates 8 and 9 may freely shift relative to the hub 1. Castellated nuts 13 may be mounted on the outer ends of the bolts 12 to hold the plates 8 and 9 assembled relative to the casings 5.

The peripheral edges of the plates 8 and 9 are inturned to provide confronting flanges 14 and on these flanges may be shrunk or otherwise mounted a tire supporting rim 15. The rim 15 is of a conventional form adapted for supporting a solid or pneumatic tire (not shown).

Mounted between the plates 8 and 9 and against the inner walls of the flanges 14 are spacing members 16 having bosses 17 and 18 engaging the inner walls of the plates 8 and 9, said bosses having stub bolts 19 extending through said plates and provided with nuts 20. The bosses 18 are two in number compared to the single boss 17 of each spacing member, and said members are reversely arranged about the flanges 14, as shown in Fig. 1, and the purpose of this arrangement is to permit of hold-fast devices 21 being mounted on the stub bolts 19 of the bosses 18, at opposite sides of the wheel. The hold-fast devices 21 are in the form of plates, between the nuts 20 and either of the plates 8 or 9, and said hold-fast devices have stub bolts 22 to which may be connected anti-skidding devices (not shown). The hold-fast devices are at all times in position and various forms of anti-skid devices may be placed on a tire and connected to the hold-fast devices.

From the foregoing, it will be observed that when a wheel body, such as herein disclosed, is provided with a solid tire, that such tire is relieved of hammering and pounding which results from the use of a rigid wheel body. An engine and transmission mechanism are also relieved of stresses and strains, particularly when a clutch is thrown in quickly or there is a sudden stop. The resilient wheel body absorbs all shocks and jars that may be caused by irregular road surfaces and the constructive arrangement of parts tends to prevent dirt and water from interfering with the action of the wheel or removal of parts.

It is thought that the utility of my invention will be apparent without further description, and while in the drawings there is illustrated a preferred embodiment of my invention, it is to be understood that the structural elements are susceptible to such variations and modifications as fall within the scope of the appended claims.

What I claim is:—

1. In a vehicle wheel, a hub, casings formed integral with said hub in proximity to the axis of said hub, resilient members in said casings, side plates supported by said resilient members and having the inner edges thereof extending onto the sides of said hub said side plates having inturned annular flanges adapted for supporting a rim, and spacing members mounted between said side plates against the flanges thereof.

2. A vehicle wheel as in claim 1, wherein the resilient members are tubular and bolts extend therethrough for holding said plates at the sides of said casings with said side plates completely closing the ends of said casings.

In testimony whereof I affix my signature in presence of two witnesses.

WILLIAM J. HOLSCHUH.

Witnesses:
KARL H. BUTLER,
ANNA M. DORR.